UNITED STATES PATENT OFFICE.

ALEXANDER TRIFONOFF AND DANIEL GARDNER, OF ST. PETERSBURG, RUSSIA.

METHOD OF TREATING ANTIMONY AND ARSENIC ORES.

1,097,897. Specification of Letters Patent. Patented May 26, 1914.

No Drawing. Application filed May 31, 1911. Serial No. 630,446.

*To all whom it may concern:*

Be it known that we, ALEXANDER TRIFONOFF and DANIEL GARDNER, subjects of the Emperor of Russia, residing at the Technological Institute of St. Petersburg, St. Petersburg, Russia, have invented certain new and useful Improvements in the Method of Treating Antimony and Arsenic Ores, of which the following is a specification.

The present invention has for its object a process for extracting antimony and arsenic from their sulfid ores and separating out the precious metals that may be contained in the gangue in an intermediate stage of the process which constitutes a cycle in the sense that some of the crude materials are regenerated and repeatedly utilized for the further treatment of quantities of ores of the same gangues or gangues poorer in the metals to be extracted. The operation is exactly similar whether antimony or arsenic ores are treated except that in the extraction of arsenic the operations are effected at lower temperatures and corresponding arsenic compounds are obtained as intermediate products. In the case of ores containing precious metals the process is only modified to the extent that the first melting process is followed by the separation of the precious metal from the molten charge whereupon the further treatment is continued unaltered.

The novel process resides in the fact that the sulfid ore is melted with sodium sulfate, sulfid of iron (for example pyrites) and carbon, with the addition of some sodium carbonate if desired; but this melting is not carried as far as the formation of the pure sulfo-salt (as suggested for example by Mac-Arthur in employing sulfate and carbon in the melting process) but in such conditions that besides the sulfo-salt ($Na_3SbS_4$ for example) oxid ($Sb_2O_3$ for example) is obtained. The rest of the mineral passes into the slag in which the iron is contained in the form of the silicate ($2FeOSiO_2$). The optional addition of sodium carbonate has solely for its object to diminish the melting temperature of the iron silicate. The melting process can be carried out in melting pots but when operating on a large scale it is preferably effected in a flame or reverberatory furnace. As already stated the melting process is not directed to the formation of the pure sulfo-salt but the antimony or arsenic is transformed approximately to the extent of one half in the form of sulfo-salt and the other half as an oxid. Then the further treatment does not consist of a wet process but in a further melting of the said compounds of the metal to be extracted while still hot with a reducing agent. It should further be noted that the introduction of sulfid of iron (pyrites or the like) into the melted mass or charge represents a step not heretofore known and which produces the result so important in practice that the mineral forms a thin liquid slag consisting mainly of iron silicates. The specifically heavier compounds collect at the bottom of the melting pot or furnace and after the removal of the slag are smelted together preferably with metallic iron and carbon as reducing agents, in accordance with the following equation:—

$$2Na_3SbS_4 + Sb_2O_3 + 3C + 5Fe = 4Sb + 3Na_2S + 5FeS + 3CO.$$

The crude metallic antimony obtained by this reaction is treated to form antimony regulus. The slag consists of sulfid of iron and sulfid of sodium. In utilizing this slag for the treatment of additional quantities of ore the $Na_2S$ is eliminated from it by leaching with water and the residual FeS is again employed in the first melting process, that is to say, for producing the sulfo-salt and the oxid. The lixiviated aqueous sulfid of sodium can be used with advantage for the treatment of ores containing but a small percentage of antimony in converting the entire amount of sulfid of antimony in the ore into sulfo-salt, which is then decomposed by means of a suitable acid in forming sulfid of antimony and the corresponding sodium salt. It is advantageous to employ sulfuric acid for this purpose as in this case sodium sulfate is obtained and this is used in the first melting process. A sulfid of sodium solution has already been employed for treating sulfur antimony ores containing gold. In accordance with the present process the sulfid of sodium is obtained as a by-product and is utilized for treating the same ores containing less antimony or arsenic. Owing to the manner in which the first melting process is carried out, the operation constitutes a cycle in which a part of the raw materials (sulfid of iron and sodium sulfate) are regenerated in an exceedingly simple manner for reutilization in the same melting process, while sulfid of sodium is obtained as a by-product which can be utilized with advantage in the further treatment.

If the ore to be treated contains a precious metal, such as gold or silver, after the first melting process and in direct continuation thereof this precious metal is separated out, this taking place in accordance with the present process by treating the entire molten charge consisting of sulfo-salt, oxid and slag, with metallic antimony or arsenic which is advantageously added to the molten mass in small pieces. The addition of sulfid of iron in the initial melting process produces an important effect because the precious metal is contained not only in the antimony compounds but also in the substance containing these compounds such for instance as "quartz." From this mineral, which owing to the ferrous compounds of iron and soda it contains, forms a very good slag, the precious metal which is drawn downward by the antimony or arsenic is precipitated, because the several constituents of the molten mass are deposited in accordance with their specific weights. The addition of the antimony or of the arsenic is continued or repeated until practically the whole of the precious metal, such as gold for example, is concentrated therein, whereupon the rest of the molten mass is subjected to the above further treatment (reduction smelting) while the precious metal is separated from the antimony by one of the usual processes. If the ores (for treating which the sulfur sodium solution obtained as a by-product is employed) poorer in sulfur antimony or arsenic ores contain a precious metal, which after the formation of the sulfo-salt of the metal in question in the manner described remains in the gangue, it is extracted therefrom by any convenient known process by the cyanid of potassium process in the case of gold for example.

What we claim and desire to secure by Letters Patent of the United States is:—

1. A process for treating sulfid ores of antimony and arsenic for the purpose of extracting these metals, consisting in melting the ore with sodium sulfate, carbon, sulfid of iron and sodium carbonate to form a sulfo salt and oxid, removing the slag formed during the melting operation, smelting the sulfo salt and oxid with iron and carbon, and recovering the sulfid of iron and the sulfid of sodium from the slag formed by the reduction process.

2. A process for treating sulfid ores of antimony and arsenic for the purpose of extracting these metals, consisting in melting the ore with sodium sulfate, carbon, sulfid of iron and sodium carbonate to form a sulfo salt and oxid, removing the slag formed during the melting operation, smelting the sulfo salt and oxid with iron and carbon, recovering the sulfid of iron from the slag formed by the reduction process by leaching the sodium sulfid therein with water.

3. A process for treating the sulfid ores of antimony and arsenic ores for the purpose of extracting these metals, consisting in melting the ore with sodium sulfate, carbon and sulfid of iron and sodium carbonate to form a sulfo salt and oxid, separating any precious metal by adding antimony or arsenic to the molten charge, removing the slag formed during the melting operation, smelting the sulfo salt and oxid with iron and carbon, and recovering the sulfid of iron from the slag formed by the reduction process by leaching the sodium sulfate therein with water.

4. A process for treating the sulfid ores of antimony and arsenic for the purpose of extracting these metals, consisting in melting the ore with sodium sulfate, carbon, sulfid of iron and sodium carbonate to form a sulfo salt and oxid, adding antimony or arsenic to the molten charge, removing the slag formed during the melting operation smelting the sulfo salt and oxid with iron and carbon and recovering the sulfid of iron from the slag, formed by the reduction process.

In testimony whereof we affix our signatures in presence of two witnesses.

ALEXANDER TRIFONOFF.
DANIEL GARDNER.

Witnesses:
H. A. LOVIAGEINE,
WILLIAM HEININGER.

Copies of this patent may be obtained for five cents each, by addressing the "Commissioner of Patents, Washington, D. C."